United States Patent [19]
Murata

[11] Patent Number: 6,128,095
[45] Date of Patent: Oct. 3, 2000

[54] IMAGE OUTPUT APPARATUS AND CONTROL METHOD THEREFOR

[75] Inventor: Masahiko Murata, Chofu, Japan

[73] Assignee: Canon Kabushiki Kaisha, Japan

[21] Appl. No.: 08/884,461

[22] Filed: Jun. 27, 1997

[30] Foreign Application Priority Data

Jul. 5, 1996 [JP] Japan ................................ 8-176683
May 22, 1997 [JP] Japan ................................ 9-132579

[51] Int. Cl.[7] .............................. B41B 15/00; B41J 15/00; G06F 15/00
[52] U.S. Cl. .................... 358/1.16; 358/1.13; 358/1.14; 358/1.15
[58] Field of Search ..................... 395/115, 113, 395/114, 116; 358/296, 1.14, 1.15, 1.16, 1.17

[56] References Cited

U.S. PATENT DOCUMENTS 5,129,049  7/1992  Cuzzo et al. ............................ 395/113
5,444,827  8/1995  Briggs et al. ............................ 395/115
5,490,237  2/1996  Zimmerman et al. .................. 395/115

*Primary Examiner*—Edward L. Coles
*Assistant Examiner*—Twyler Lamb
*Attorney, Agent, or Firm*—Fitzpatrick, Cella, Harper & Scinto

[57] ABSTRACT

An image output apparatus generates image data in band units, and performs image-data generation and image-data output alternately using two band memories. Prior to image-data output, image data is preparatorily generated by each band, and it is determined whether or not there is a band requiring time for image-data generation longer than time for image-data output for one band. Regarding this band, the preparatorily-generated image data is stored. Upon printing, regarding a band, of which it has been determined that image data can be generated in realtime, image is generated in parallel to image output from its previous band, while regarding a band, of which it has been determined that image data cannot be generated in realtime, the stored image data is outputted after the completion of image output from its previous band.

30 Claims, 14 Drawing Sheets

FIG.5

| | | REALTIME PRINTING POSSIBLE/IMPOSSIBLE (COMPRESSION FLAG) |
|---|---|---|
| BAND 1 | | ○ |
| BAND 2 | | ○ |
| BAND 3 | | × |
| BAND 4 | | ○ |
| BAND 5 | | × |
| BAND 6 | | × |
| BAND 7 | | ○ |
| BAND 8 | | ○ |

IMAGE OUTPUT APPARATUS AND CONTROL METHOD THEREFOR

BACKGROUND OF THE INVENTION

This invention relates to an image output apparatus such as a printer which, e.g., generates an image from image data and outputs the image, and a control method for the image output apparatus.

Conventionally, image output apparatuses which generates images from object data are known. The object data includes information on the position, the size, the color and the like of a character, a figure, a natural image or the like. The apparatuses combine the images corresponding to the objects, and output the obtained image. In these image output apparatuses, there is a limitation upon time for generating the image to be outputted. For example, a page printer, having a printer engine based on a laser-beam printing method, divides one-page image data into a plurality of band data, then generates and outputs images for respective bands. Accordingly, in a case where printing of one band image has been completed and printing for the next band is performed, if the next band image has not been formed at a point where the previous band image has been print-outputted, the printer becomes in "over-run" condition, i.e., a status indicating that the printer engine continues printing while there is no print data. When this over-run occurs, a desired image cannot be appropriately printed. Further, since there is limitation upon time for image generation, conventionally, time necessary for generating images from all the objects included in an image to be outputted is predicted, and it is determined whether or not image data can be generated within the limited time.

Next, a printer as an example of the conventional image output apparatus will be described with reference to FIGS. 12 and 13.

In FIG. 12, a processing program list 201 is formed in a memory. The respective entries of the processing program list 201 are object data including information on the type of image to be generated, the position of the image on an image memory 205, the position of a target image on a font memory, and expansion and/or rotation instruction. Note that the image memory 205 has addresses corresponding to a print sheet 204 on which the generated image will be printed. Note that in FIG. 12, the image memory 205 has a size corresponding to one of multiple bands for one page. This type of image memory will be specifically referred to as "band memory".

An image generator 202 reads object data from the processing program list 201, and in accordance with the content of the data, generates an image. For example, if the read object data indicates a character, the image generator 202 reads a corresponding character pattern from a pre-registered character font 203, and generates the character image, then provides the character image in the image memory 205 at a position corresponding to a printing position.

FIG. 13 shows the image memory 205. Since the image memory 205 is a band memory, it is required to provide at least two image memories 205 to avoid over-run. In use of two band memories, image generation and image output are alternately performed by using the two band memories. Thus, to realize one-page print output with two image memories, time for mapping an image on one image memory must be shorter than time for print-outputting the image. In a printer using the band memories, the processing-time limitation corresponds to this relation between image generation time and image output time.

In this manner, as time-limitation is imposed on image generation, the time for image generation is predicted, and the occurrence of over-run is predicted. That is, time for generating an image is predicted for an object included in the image generated in a band memory, then it is determined whether or not over-run occurs. When the occurrence of over-run is predicted, it is necessary to generate the band image and store the image prior to printing, accordingly, a large-capacity image memory is required. If the image memory is lacking, printing might be impossible without additional memory, otherwise, printing might be performed with poor image quality due to degradation of printing quality such as resolution or tonality of image.

However, as images corresponding to objects cannot be generated in the same time because of types and sizes of the object, it is impossible to exactly predict the image generation time. Further, in the image output apparatus, a controller that performs image generation occasionally performs processing operation of other elements, which often disturbs smooth processing and disables optimal performance of the image output apparatus. Accordingly, predictable time should be a value having sufficient margin with respect to time used for image generation with the optimal performance of the image output apparatus, in consideration of various tolerances. However, this margin causes prediction of over-run even with respect to an image which can be outputted without over-run. This increases storing an image for avoiding over-run, thus causes image memory shortage or degradation of printing quality.

SUMMARY OF THE INVENTION

The present invention has been made in consideration of the above situation, and has its object to provide an image output apparatus having greatly-improved processing performance by reliably predicting on whether or not a print image can be generated within a predetermined limited time, and control method for the image output apparatus.

According to the present invention, the foregoing object is attained by providing an image output apparatus comprising: storage means for storing a series of object data as a base of image data; generating means for generating image data from the object data; image-output means for outputting the image data as an image; time measuring means for measuring time; and control means for controlling the generating means to preparatorily generate image data from the object data stored in the storage means, controlling the time measuring means to measure necessary time for preparatorily generating the image data by the generating means, and determining whether or not image generation from the object data in realtime can be performed in parallel to image output by the image output means, based on the necessary time and an image-output speed by the image output means.

According to the present invention, the foregoing object is attained by providing a control method for an image output apparatus which generates image data from a series of object data as a base of image data and outputs the image data as an image from an image output means, comprising: a generating step of preparatorily generating image data from the object data; a measuring step of measuring necessary time for image generation at the generating step; and a determination step of determining whether or not image generation from the object data in realtime can be performed in parallel to image output by the image output means, based on the necessary time and an image-output speed by the image output means.

According to the present invention, the foregoing object is attained by providing a storage medium storing control program codes for an image output apparatus which generates image data from a series of object data as a base of image data and outputs the image data as an image from image output means, comprising: generation process codes for preparatorily generating image data from the object data; measuring process codes for measuring necessary time at the generation process; and determination process codes for determining whether or not image generation from the object data in realtime can be performed in parallel to image output by the image output means, based on the necessary time and an image-output speed by the image output means.

According to the present invention, the foregoing object is attained by providing an image output apparatus having at least two band memories for storing image data for bands, determined by dividing an image for one page, comprising: storage means for storing a series of object data as a base of image data in band units; preparatory image generation means for preparatorily generating image data from the object data, measuring necessary time for image generation by each band, comparing the necessary time with output time necessary for outputting one-band image data, and if the necessary time is larger than the output time, determining that image generation cannot be performed in realtime, and storing the preparatorily-generated image data; and output control means for, regarding a band, of which it has been determined that image data cannot be generated in realtime, generating image data from the object data in parallel to image output of a previous band and outputting the generated image data following the image output of the previous band, while regarding the band, of which it has been determined that image data cannot be generated in realtime, outputting the preparatorily-generated image data stored by the preparatory image generation means, following image output of a previous band.

According to the present invention, the foregoing object is attained by providing a control method for an image output apparatus having at least two band memories for storing image data for bands, determined by dividing an image for one page, comprising: a preparatory image generation step of preparatorily generating image data from the object data; a measuring step of measuring necessary time for image generation by each band; a preparatory image generation step of comparing the necessary time with output time necessary for outputting one-band image data, and if the necessary time is larger than the output time, determining that image generation cannot be performed in realtime, and storing the preparatorily-generated image data; and an output control step of, regarding a band, of which it has been determined that image data can be generated in realtime, generating image data from the object data in parallel to image output of a previous band and outputting the generated image data following the image output of the previous band, while regarding the band, of which it has been determined that image data cannot be generated in realtime, outputting the preparatorily-generated image data stored at the preparatory image generation step, following image output of a previous band.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is an explanatory view showing determination of possibility of over-run by each band;

DETAILED DESCRIPTION OF THE PREFERRED EMBODIMENTS

Preferred embodiments of the present invention will now be described in detail in accordance with the accompanying drawings.

First, the outline of an image output apparatus and a control method for the image output apparatus according to the embodiments of the present invention will be described, and the detailed explanation will be made thereafter.

The image output apparatus and the control method for the image output apparatus employ a counter, which starts when processing starts based on a processing program list for image generation and stops when the processing ends. Based on the count value from the counter, processing time of an image generating unit is measured by each processed image.

Further, measured processing time with respect to each of processing program list is sequentially written into a memory in the system.

The above construction exactly predicts whether or not all the necessary images can be generated within a predetermined limited time, thus greatly improves processing performance.

Further, if occurrence of over-run is predicted, the efficiency of memory use is improved by compressing and storing the generated image data, which avoids degradation of printing quality.

Hereinbelow, the embodiment of the present invention will be described in detail.

First Embodiment

Figure 1:
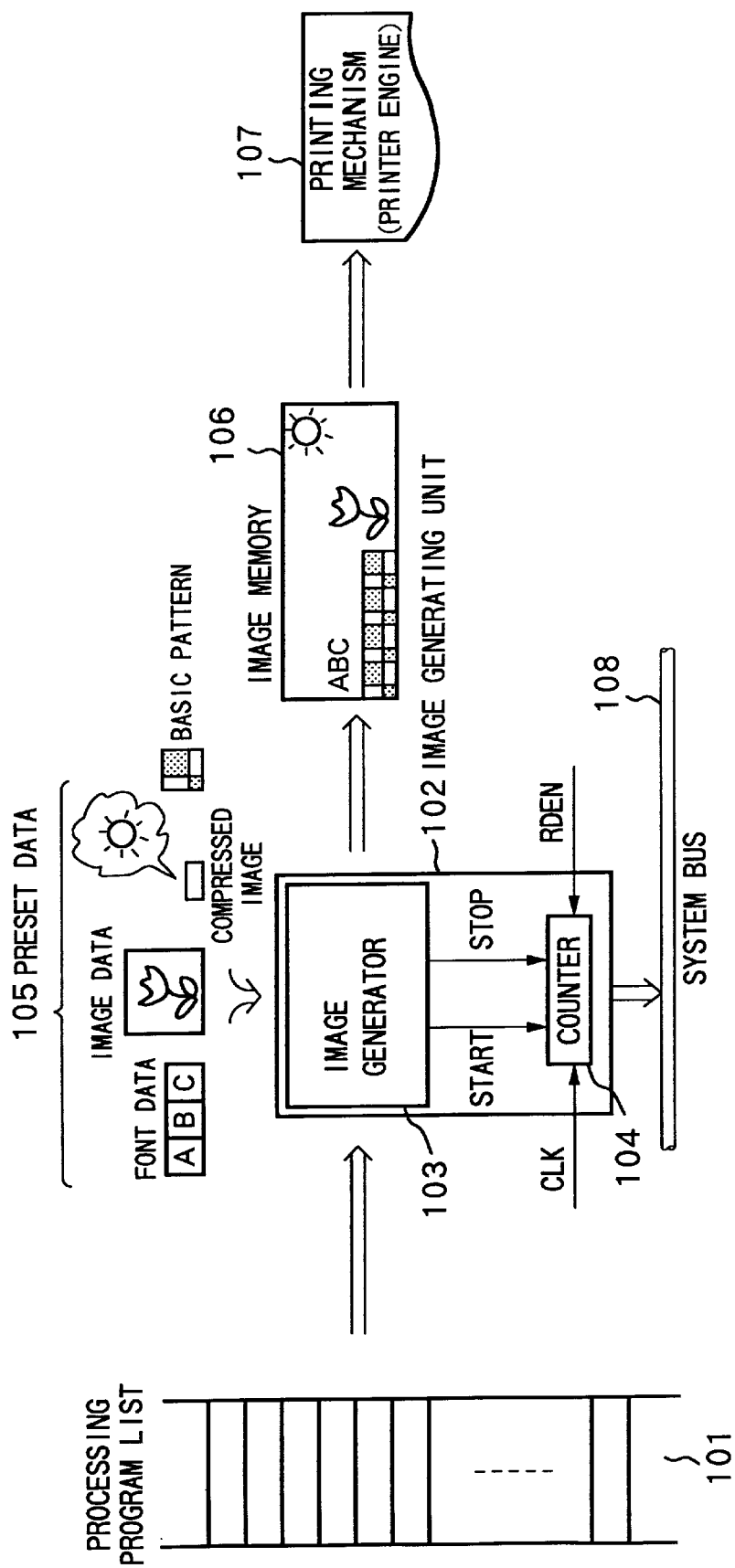
FIG. 1 is a block diagram showing the construction of a printer according to a first embodiment.

FIG. 1 shows the construction of a printer according to a first embodiment of the present invention.

In FIG. 1, a processing program list 101 is a list of object data included in image data. The object data includes programs and data designating the type of image objects such as character, figure, dot image and the like, the drawing position of these objects on an image memory, and instructing data process such as enlargement, rotation, expansion of compressed data, the number of repetition and the like. Note that an image, generated from the object data as a set of a program and/or data for generating the image, will be referred to as an "image object".

The image generating unit 102 sequentially reads the respective object data in the processing program list 101. The image generating unit 102 generates an image object, using preset data 105 such as font in accordance with necessity, performs designated data process on the image object, and provides the image object in a designated position in an image memory 106.

When one object data has been mapped, the next object data is read from the processing program list 101 and next image formation is performed by using the next object data.

As image objects have been generated using all the object data in the processing program list and provided in the image memory 106, image formation processing with respect to the next processing program list is performed.

The image data in the image memory 106 is sent in accordance with transfer of a print sheet to a printing mechanism (printer engine) 107 based on, e.g., an electrophotographic method, and an image is printed on the print sheet based on the image data.

In the present embodiment, an image generator 103 reads one processing program list, and at the same time, sends a start signal to a counter 104. When all the image objects have been generated using the objects data included in the read processing program list, the image generator 103 sends a stop signal to the counter. This obtains time for generating images included in one program list as a cumulative value of a clock signal (CLK) inputted into the counter 104.

The counter 104 is connected to a system bus 108. As a read signal (RDEN) is inputted into the counter 104, the count value is read out to an external device such as a CPU via the system bus 108.

Thus, measuring time in preparatory image formation obtains the image generation time, reflecting various data, data process methods, operational statuses of other parts of the system and the like. Then, more exact over-run prediction can be made based on the obtained measured data before printing is started by the printing mechanism.

Note that in the present embodiment, the processing program list 101, the preset data 105 and the image memory 106 exist in a memory such as a RAM; however, they may physically exist in the same memory or different memories.

Second Embodiment

Figure 2:
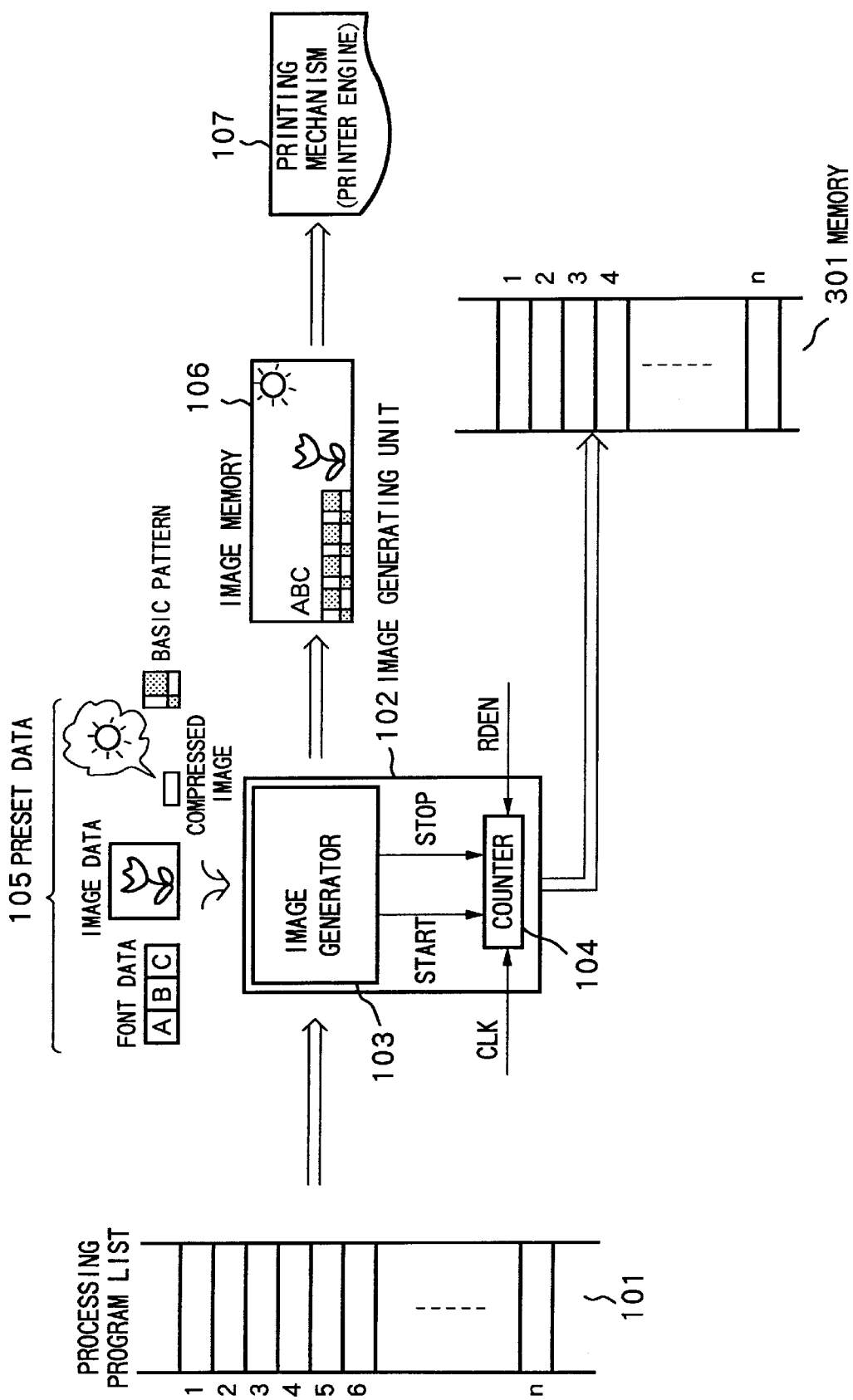
FIG. 2 is a block diagram showing the construction of the printer according to a second embodiment.

FIG. 2 shows the construction of the printer according to a second embodiment of the present invention. Note that the elements corresponding to those in FIG. 1 have the same reference numerals. Next, the second embodiment will be described with reference to FIG. 2.

In this embodiment, count values with respect to the objects of the processing program list, sequentially processed by the image generating unit 102, are stored into corresponding addresses in a memory 301. This enables measurement of processing time for generating a large amount of images at once, thus more easily collects data on time for image generation.

For example, one processing program list is a list of image objects included in one band, and in FIG. 2, a one-page image is composed of n bands. The image generator 103 performs preparatory image formation on the processing program lists for one page, i.e., n processing program lists. In this case, time necessary for image generation is measured by each processing program list, i.e., by each band, and stored into the memory 301.

If there is a band predicted to cause over-run, the generated image data for the band or the overall page including the band is stored. The necessary image generation time stored in the memory 301 is referred to upon actual printoutput by the printing mechanism 107. If there is a band predicted to cause over run, the stored image data is sent to the printing mechanism 107. If it seems that over-run will not occur, then, upon printing, image data is generated from the processing program list again, and sent to the printing mechanism 107.

Figure 3:
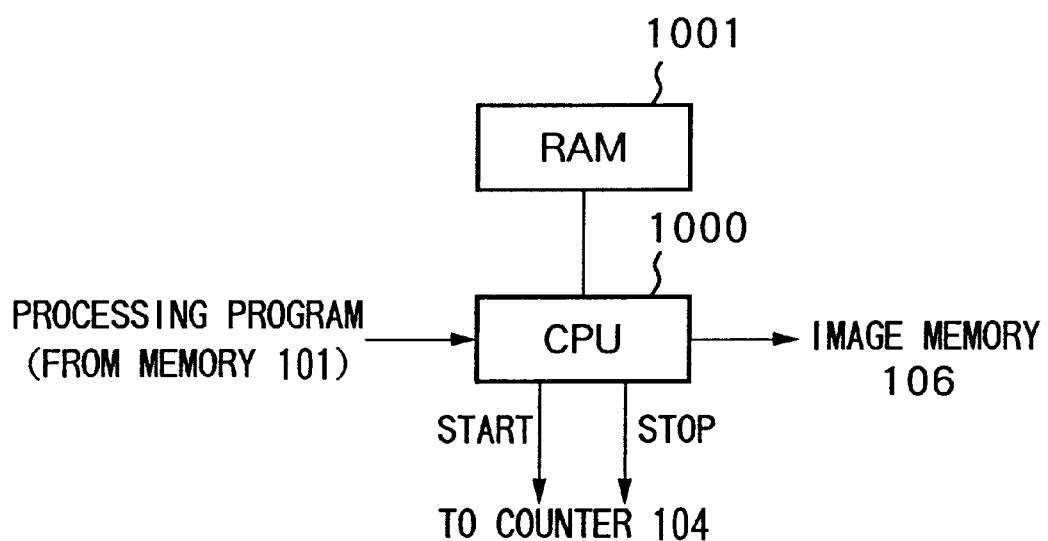
FIG. 3 is a block diagram showing an example of an image generator.

FIG. 3 shows an example of the construction of the image generator 103. This construction, having a CPU 1000 and a RAM 1001, sequentially reads object data from the memory in which the processing program list 101 is stored, and executes processing corresponding to the object data. The generated image object is stored into the image memory 106. The RAM 1001 is a memory serving as a work area for the CPU 1000 to perform processing.

Upon starting processing of the processing program list 101, the CPU 1000 outputs a start signal to the counter 104 to start counting. Also, upon terminating the processing of the processing program list 101, the CPU 1000 outputs a stop signal to the counter 104 to stop the counting.

Note that to start and end the processing of the processing program list 101, it may be arranged such that a predetermined start program code and a predetermined end program code are set at the head and end of the processing program list 101, and while the CPU 1000 sequentially reads the processing program list 101, upon recognizing these codes, outputs the start signal and the stop signal. Further, another construction of the image generator 103 may be made by hardware logic construction.

As described above, the printer according to the first or second embodiment reliably predicts whether or not all the necessary images can be generated within a predetermined limited time, with a simple construction, which greatly improves processing performance.

Third Embodiment

Figure 4:
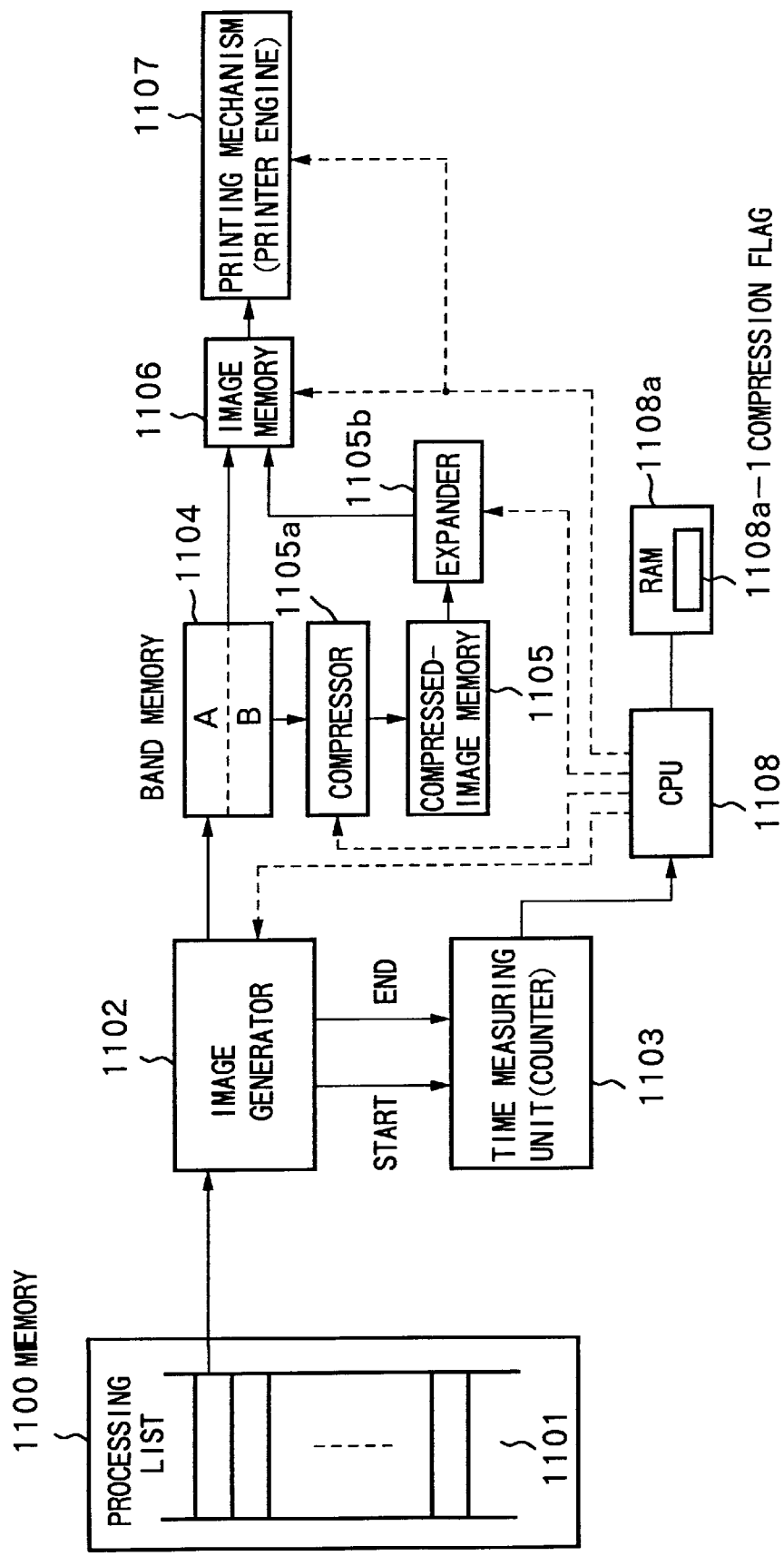
FIG. 4 is a block diagram showing the printer according to a third embodiment.

FIG. 4 shows the construction of the printer according to a third embodiment of the present invention.

In FIG. 4, a processing list 1101 is a list having object data as entries. The respective object data indicates the type of image object such as character, figure, natural image and the like, the position of the image object in the image memory, and data process method such as enlargement, rotation, expansion of compressed data and the like. The image generating unit 1102 reads the processing list 1101, selects object data included in the list, performs designated data process, thus generates image object, and provides the image object at a designated position of a band memory 1104. The image generation here means generating a dot image, with performing the designated process necessary for location in the band memory corresponding to a printing position, from data on size, the type of image object and the like, and writing the generated dot image into the band memory.

When one image object has been generated, the next object data is read from the processing list 1101, and an image object based on the read object data is mapped in the band memory 1104. The processing list 1101 has a band-unit structure. The completion of all the image objects included in one processing list corresponding to one band corresponds to the completion of one-band image formation, which enables print-outputting the band.

A time measuring unit 1103, comprising a timer, counter or the like, is started when the image generating unit 1102 starts image generation for one band, and is stopped when the image generating unit 1102 has terminated the image generation. The band memory 1104 has memories A and B for at least two bands. While image data is generated for one band memory, image data is outputted from the other band memory. The image generation and image output are alternately performed in the respective two band memories, thus completing printing for one page.

A compressed-image memory 1105 is a memory in which image data generated in the band memory 1104 is compressed and stored. An interface 1106 includes a band memory for storing a band outputted in printing, and a printer interface for sending data, expanded and outputted from the compressed-image memory 1105, in data format or data sequence processible by the printing mechanism 1107. The printing mechanism 1107 prints an image based on the image data on a print medium by, e.g., an electrophotographic printing method.

Upon storing the content of the band memory 1104 into the compressed-image memory 1105, a compressor 1105a compresses the data in a predetermined method, and upon reading the data from the compressed-image memory 105, an expander 1105b expands the compressed data.

The overall printer is controlled by a CPU 1108. The CPU 1108 controls the image generating unit 1102 and compression and expansion of image data. Further, the CPU 1108 stores a compression flag to be described later into a RAM 1108a, and refers to the compression flag for controlling output of image data.

Figure 6:
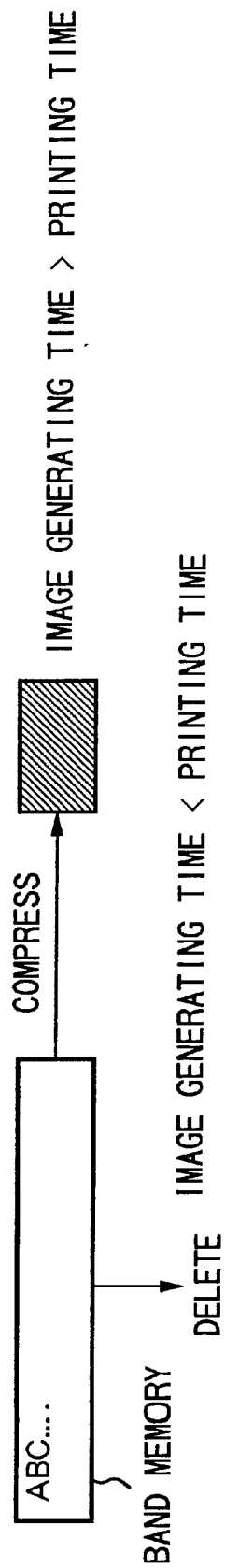
FIG. 6 is an explanatory view showing handling image data with/without the possibility of over-run.
Figure 7:
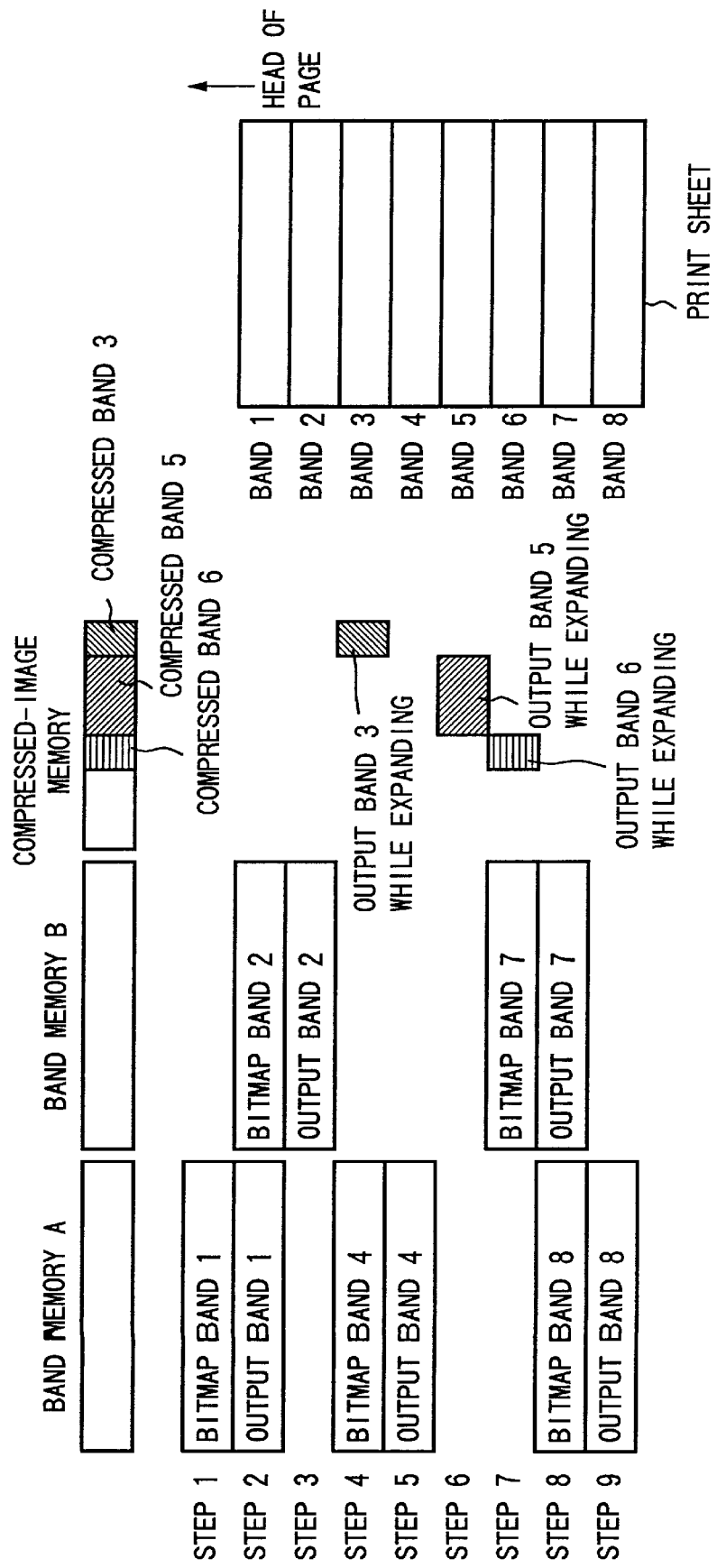
FIG. 7 is an explanatory view showing an example of procedure of generating one-page image.

FIGS. 5 to 7 show a processing method of the present embodiment. FIG. 5 shows an example of the structure of the bands constructing one page; FIG. 6, the method for processing image data generated in the band memory; and FIG. 7, an example of a procedure of printing processing.

As shown in FIG. 5, in the printer of the present embodiment, a page to be printed is divided into eight bands. Normally, upon printing, image data for respective bands are generated, sequentially from the head of the page, alternately in the band memories A and B. While image data is generated in one band memory, image data stored in the other band memory is print-outputted, thus printing for one page is performed. However, when over-run occurs, this print processing is not performed as described above. For this reason, the possibility of over-run is determined in advance, and processing for the determination, i.e., preparatory image formation, is performed.

For example, in FIG. 5, realtime printing using bands 1, 2, 4, 7 and 8 is possible but realtime printing using bands 3, 5 and 6 is impossible. The meaning of "realtime printing is possible using a band" is that while an image for one band is printed, image data of the band can be generated without causing over-run. That is, the CPU 1108 controls the time measuring unit 1103 to measure times Tg1 to Tg8 for generating image data based on the bands 1 to 8, in a similar manner to that described in the second embodiment, and compares the measured times Tg1 to Tg8 with time Tpb for printing an image for one band on a print sheet by the printing mechanism 1107. If Tgi (i=1 to 8)<Tpb holds for a band i, it is determined that image object can be generated from object data without causing over-run, while printing is performed based on the previous band (i-1).

FIG. 6 shows how image data generated for each band is processed. Prior to printing, image data based on the band i is preparatorily generated in one band memory and the image generation time Tgi is measured. If the measured time Tgi is shorter than the printing time Tpb for printing an image based on the image data, over-run will not occur in printing using the band, therefore, the preparatorily generated image data is not necessarily stored, for the same image data is generated upon actual printing. Accordingly, the image data is deleted.

On the other hand, if the measured time Tgi is longer than the printing time Tpb, there is a possibility of over-run in image generation using the band. To prevent over-run, it is necessary to save the image data based on this band preparatorily generated until actual printing is performed. In the present embodiment, in consideration of efficient use of memory, the image data is compressed and stored, and upon printing, it is sent to the printing mechanism 1107 while it is expanded.

The above processing, i.e., preparatory image formation, is sequentially performed on the respective bands using the same band memory. The results of realtime-printing possible/impossible determination with respect to respective bands, and image data based on band(s) determined to cause over-run, are compressed and stored. The results of realtime-printing possible/impossible determination are stored in compression flags 1108a–l, and the compressed image data of the bands determined to cause over-run are stored in the compressed-image memory 1105.

FIG. 7 shows an example of sequence of printing the page shown in FIG. 5. This sequence is executed by the respective elements in FIG. 4, under the control of the CPU 1108.

At step 1, the image generating unit 1102 generates image data of the band 1 in the band memory A. At step 2, the printing mechanism 1107 is activated to start printing. As the printing has been started, the image data of the band 1 is outputted from the band memory A to the printing mechanism 1107. At this time, image data of the next band, i.e., the band 2 is generated, in the band memory B. At step 3, the image data of the band 2 is outputted from the band memory B to the printing mechanism 1107, and image printing is performed.

At step 4, compressed image data of the band 3 is sent from the compressed-image memory 1105, while being expanded, to the printing mechanism 1107, and at the same time, image data of the band 4 is generated in the band memory A. At step 5, the image data of the band 4 is outputted from the band memory A to the printing mechanism 1107, and image printing is performed.

At steps 6 and 7, the compressed images of the bands 5 and 6 are outputted to the printing mechanism 1107 and image printing is performed. At the same time, at step 7, image data of the band 7 is generated in the band memory B. At step 8, the image data of the band 7 is outputted from the band memory B to the printing mechanism 1107, and at the same time, image data of the band 8 is generated in the band memory A. At step 9, the image data of the band 8 is outputted from the band memory A to the printing mechanism 1107, and printing is performed. Thus, printing for one page is completed.

Note that the CPU 1108 generates the processing list 1101 for the respective bands in the memory 1100 before performing the above processing steps 1 to 9. Then the CPU 1108 performs activates the image generating unit 1102, reads processing time from the time measuring unit 1103 for measuring time at the end of printing, or activates the image generating unit 1102 for generating band image data, performs compression and/or expansion on image data, further activates and stops the printing mechanism 1107.

In the present embodiment, the processing is made in band units, however, in case of printing plural pages, similar processing may be easily performed in page units. Further, the respective elements may be replaced by software for performing the processing. For example, the time measurement may be made by timer interruption.

Figure 9:
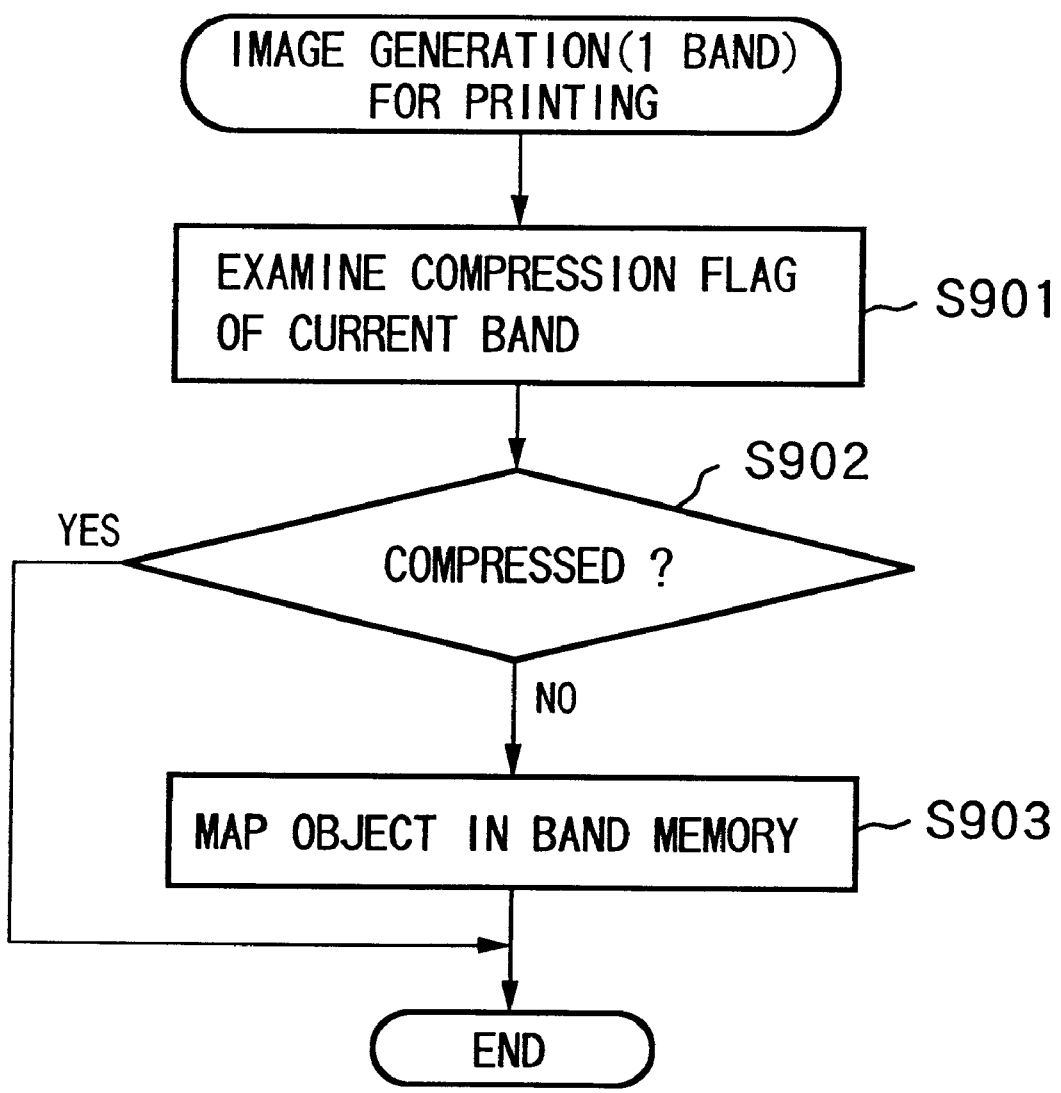
FIG. 9 is a flowchart showing a procedure of image generation for printing.
Figure 10:
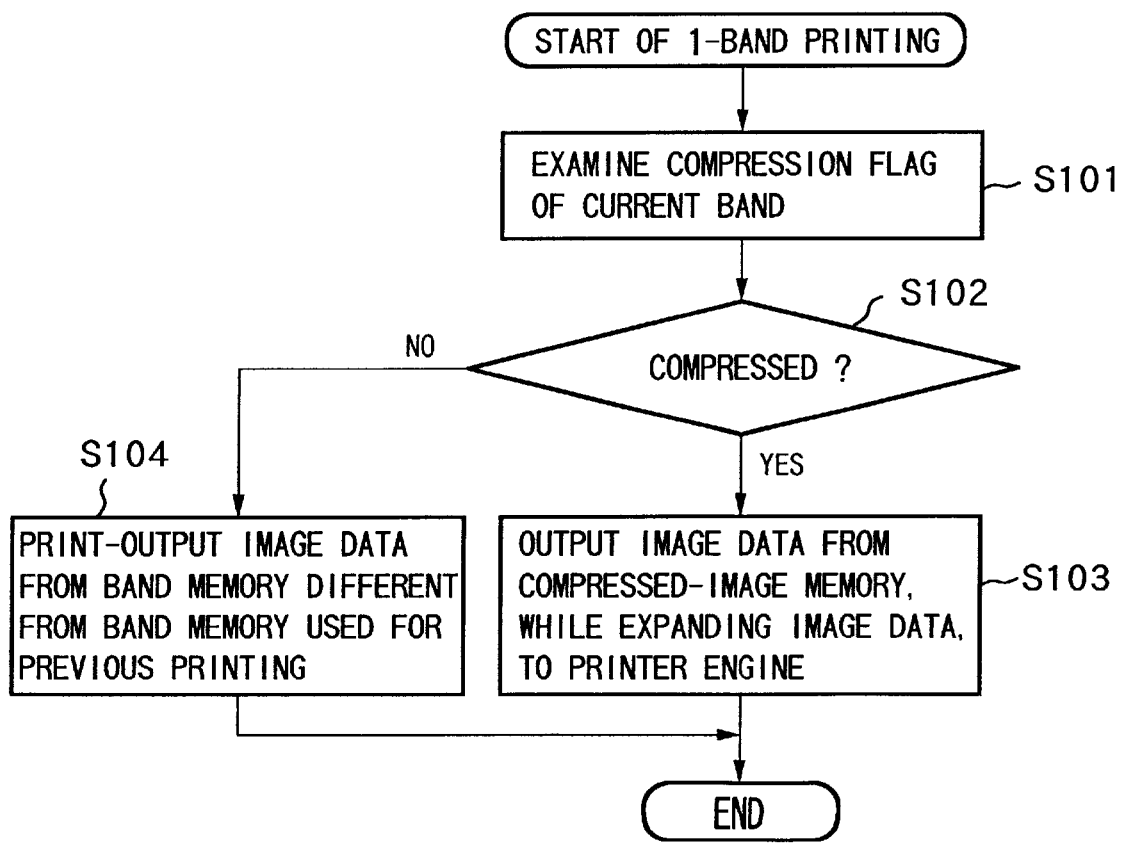
FIG. 10 is a flowchart showing a procedure of printing one-band image.
Figure 11:
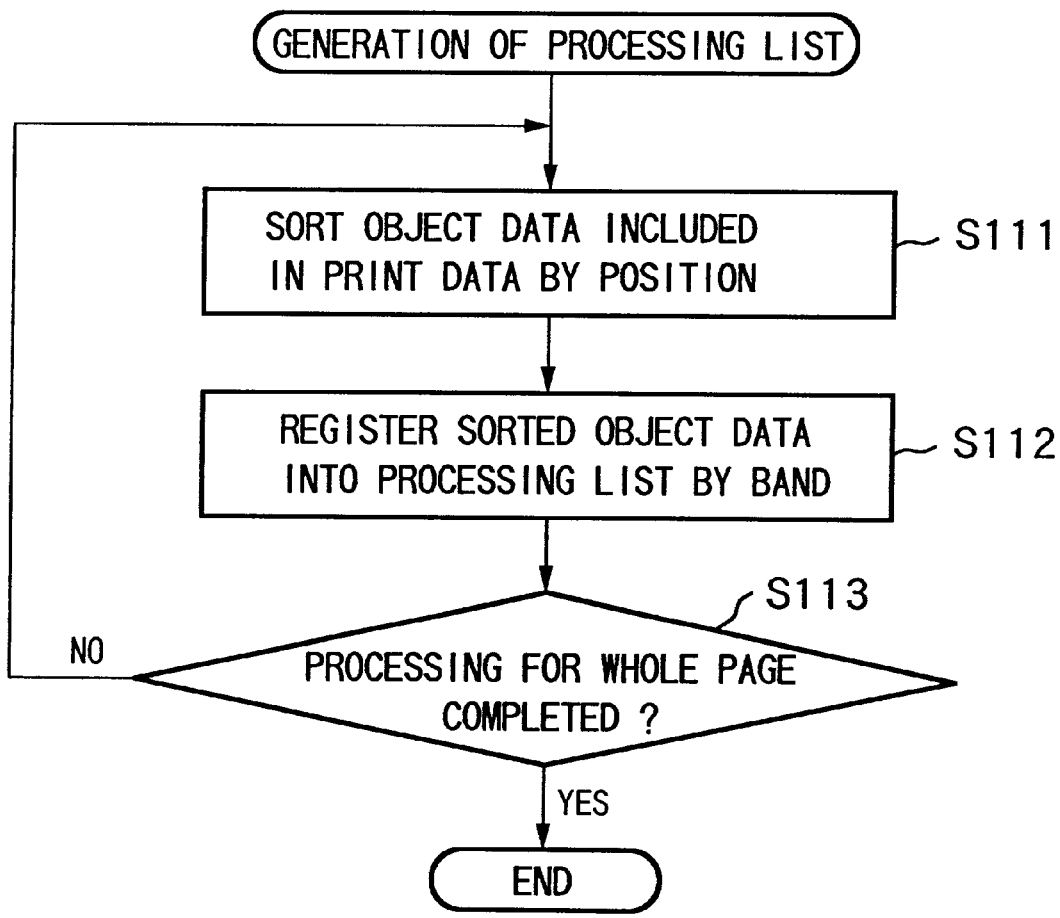
FIG. 11 is a flowchart showing a procedure of generating a processing list.
Figure 12:
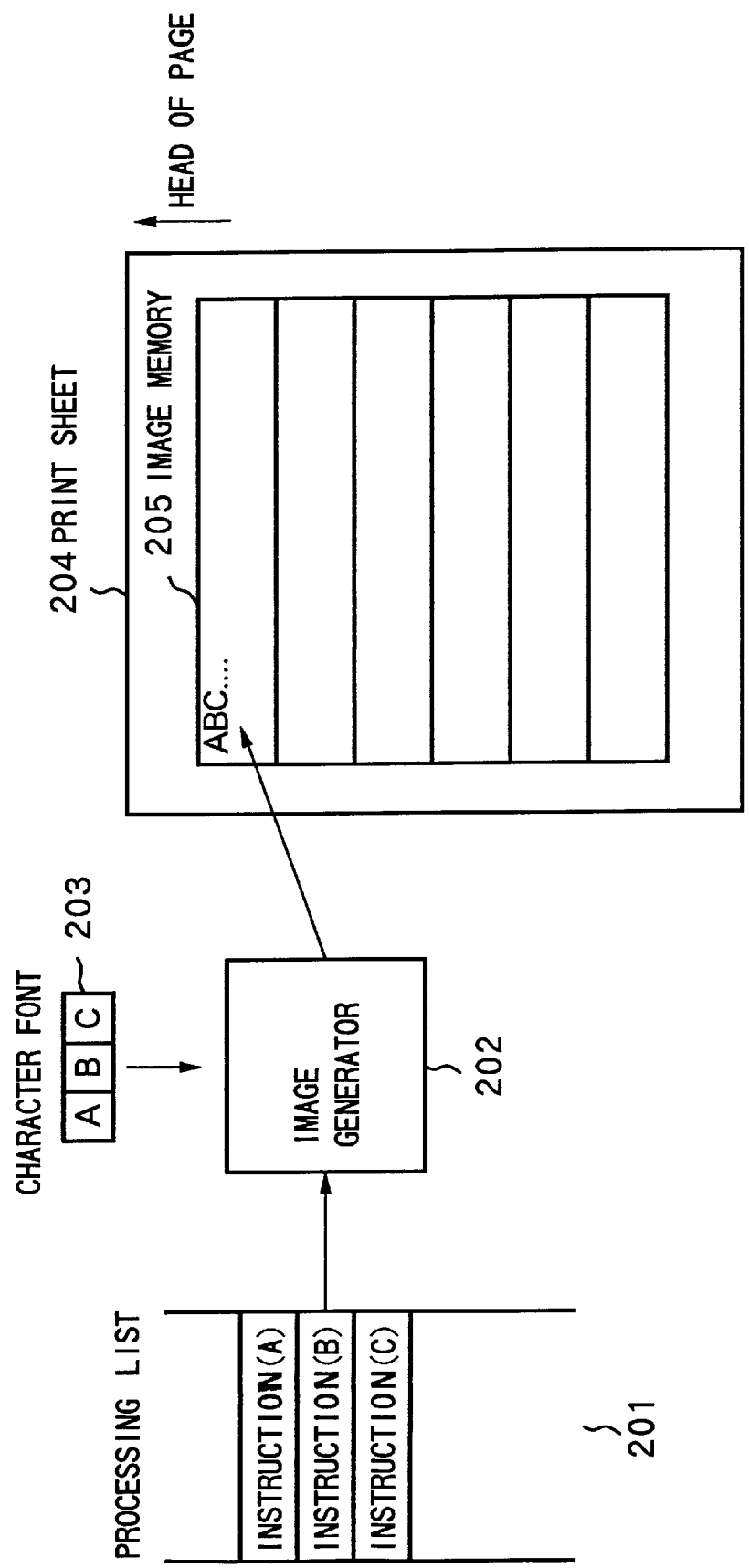
FIG. 12 is a block diagram showing the construction of the conventional image output apparatus.
Figure 13:
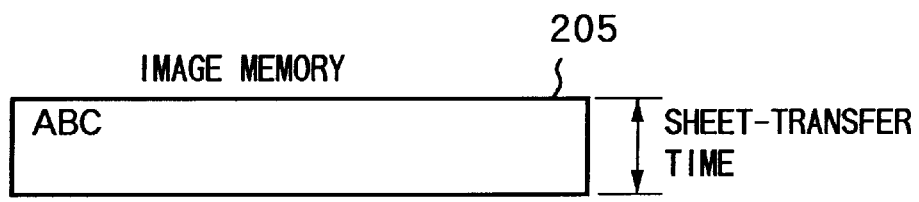
FIG. 13 is a block diagram showing the image memory 205 of the conventional image output apparatus.

FIGS. 8 to 11 show a control procedure of the CPU 1108. FIG. 11 is a flowchart showing a procedure of generating the processing list. Before the procedure in FIG. 11 is started, the printer receives print data including object data in page units from an external device such as a host computer. The print data is written in, e.g., page description language describing image objects such as characters, figures or dot images by their type, size, position and the like.

At step S111, object data included in the print data are sorted by positions in one-page image. This sort may be performed only with respect to a print-sheet conveying direction upon printing, since the sort is made for examining bands including the respective objects. For example, if the position of an object is represented by (X,Y) coordinates (Y-coordinate is in band-height direction) in one-page image, the sort is performed with respect to the Y-coordinates.

Next, at step S112, the sorted object data are registered into the band-based processing list 1101 and stored into the memory 1100.

Finally, at step S113, it is determined whether or not the processing at steps S111 and S112 has been completed for the whole page. If NO, the process returns to step S111 to repeat the processing.

Figure 8:
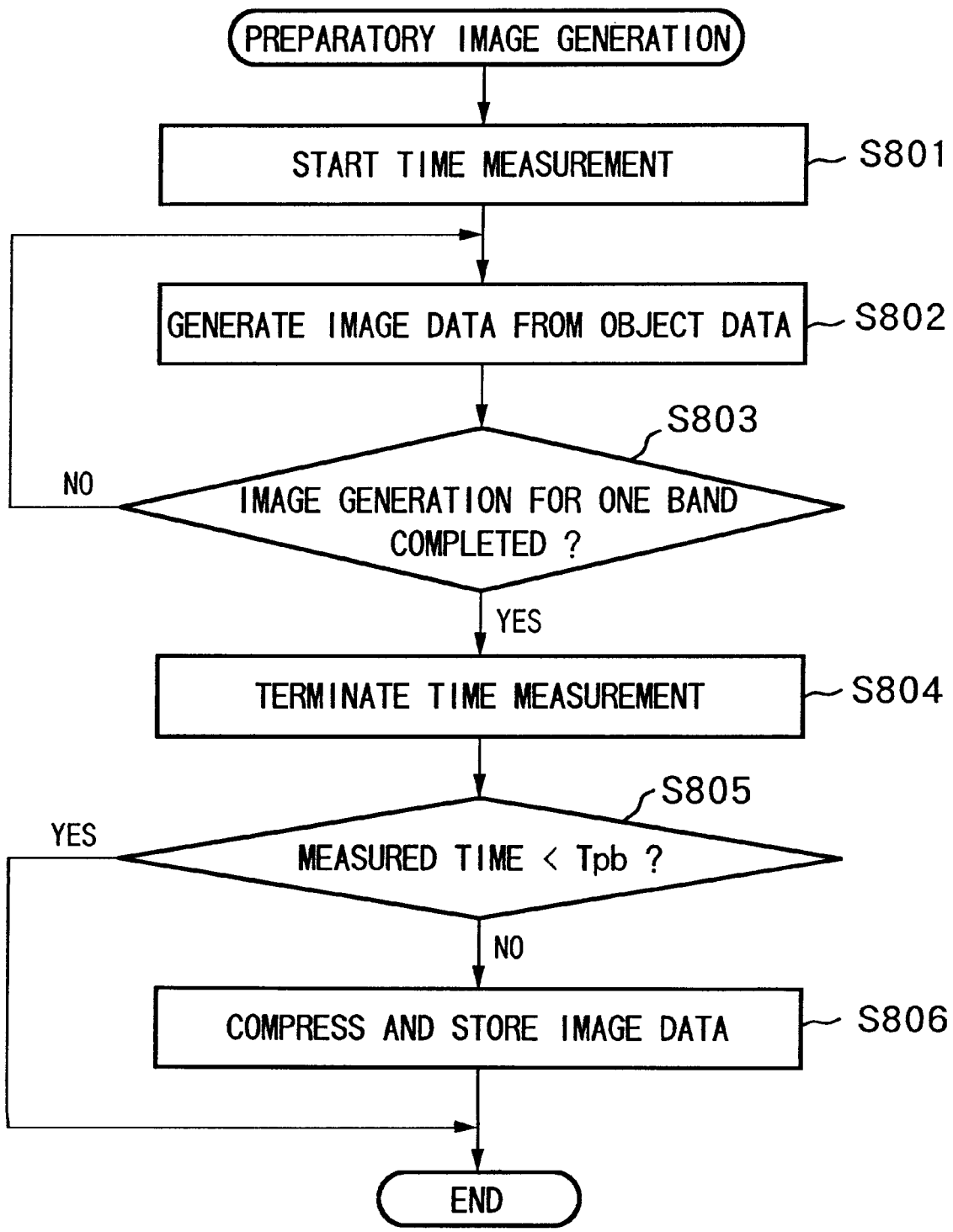
FIG. 8 is a flowchart showing a procedure of preparatory image generation.

In FIG. 8, preparatory image generation is performed with respect to the generated processing list 1101 to predict the possibility of over-run. In a case where print data for plural pages exists, this procedure is repeated for the number of pages.

First, at step S801, the start signal is sent to the time measuring unit 1103 to start time measurement. At step S802, image data is generated from one object data in the processing list 1101 and written into the band memory A by the image generating unit 1102. At step S803, if it is determined that image data for one band has been generated, the process proceeds to step S804, at which an end signal is sent to the time measuring unit 1103 to terminate the time measurement.

At step S805, the measured time is compared with the time Tpb necessary for the printing mechanism 1107 to print one-band image. If the measured time is longer than the time Tpb, the image generating unit 1102 cannot generate the image data for the one band in the processing list 1101 currently being processed during printing using the previous band. That is, there is a possibility that over-run will occur. Accordingly, at step S806, the image data generated at step S802 is compressed by the compressor 1105a and stored into the compressed-image memory 1105. At the same time, flag information indicating whether or not image data has been compressed and stored is stored into the RAM 1108a.

Note that the head band of the one page is not related to its previous band, since the previous band belongs to a different page, accordingly, time for generating the head band is not limited. For this reason, the preparatory image generation for the head band may be omitted.

When the preparatory image generation has been completed, printing is started. FIG. 9 shows a procedure of image generation for one band upon printing.

First, at step S901, in the PAM 1108a, the compression flag of the band is examined. At step S902, it is determined based on the value of the flag whether or not the image data of the band is compressed. If YES, image data is not generated, while if NO, the process proceeds to step S903, at which image data of the currently-processed band is generated in an available band memory.

FIG. 10 shows a procedure of printing one-band compressed image data for one band, generated in FIG. 8, or one-band image data generated in FIG. 9. First, at step S101, the compression flag of a band to be used in printing is examined. At step S102, it is determined based on the value of the flag whether or not the image data of the band is compressed. If YES, the process proceeds to step S103, at which compressed image data stored in the compressed-image memory 1105 is outputted to the printing mechanism 1107 while being expanded by the expander 1105b. On the other hand, if NO, the process proceeds to step S104, at which image data is print-outputted from a band memory different from the other band memory used for previous printing.

This enables printing without discontinuity of data between bands, and prevents over-run. Further, as time necessary for image generation for each band is measured, prediction of over-run can be exactly made. Furthermore, as image data to be stored is compressed, the necessary memory amount is not greatly increased.

Note that the procedures in FIGS. 8 to 11 are control procedures of the CPU 1108, however, it may be arranged such that the CPU 1108 performs all or any of the image generation by the image generating unit 1102 shown in FIG. 4 and image compression/expansion. In such case, in the flowcharts of FIGS. 8 to 11, steps controlling the image generating unit 1102, the compressor 1105a and the expander 1105b are changed to steps at which image generation, image compression and expansion are performed by the CPU 1108 itself. The program executed by the CPU 1108 is stored in a ROM integrated in the CPU 1108, or it is supplied from an exchangeable storage medium and stored into the RAM 1108a.

Fourth Embodiment

As a fourth embodiment, it may be arranged such that processing is quickened by utilizing the conventional over-run prediction instead of the preparatory image generation with respect to all the bands in the third embodiment. That is, as the conventional technique, time necessary for image generation is predicted by the CPU 1108 from the type, number etc. of the object data included in the processing list, and preparatory image generation is omitted with respect to a band that will not apparently cause over-run, while preparatory image generation is performed with respect to a band having a possibility to cause over-run. This reduces the amount of the preparatory image generation processing, and enables more efficient printing.

Figure 14:
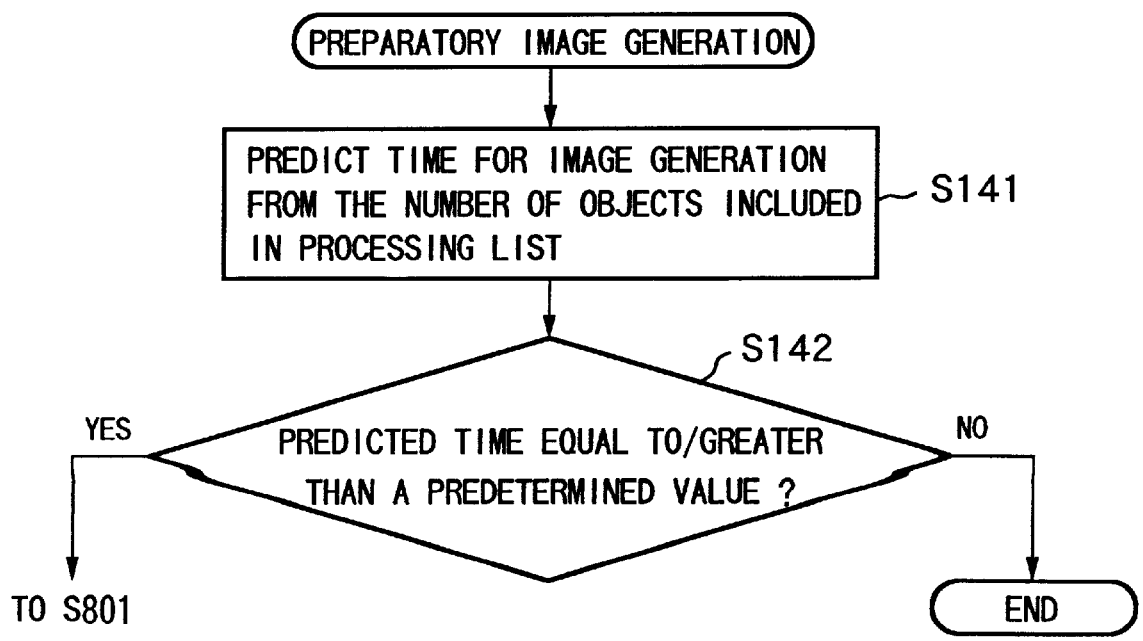
FIG. 14 is a flowchart showing the procedure of preparatory image generation according to a fourth embodiment.

FIG. 14 shows a procedure of the preparatory image generation according to the fourth embodiment. At step S141, time necessary for generating image data of the entire processing list is predicted, by multiplying time for processing one object by the number of objects in the processing list. At step S142, it is determined whether or not the value is greater than a predetermined value. If YES, the process proceeds to step S801 in FIG. 8, while if NO, process ends without preparatory image generation as the band.

Fifth Embodiment

In the third embodiment, time necessary for image generation is measured by preparatorily generating image data from all the objects included in the processing list. However, as a fifth embodiment, assuming that in many cases, there is not so much variation in objects actually used in printing, the time necessary for determination of possibility of over-run can be saved.

That is, regarding character data, and typical image data indicative of a circle, a rectangular, a ruled line and the like, standard time necessary for image generation is stored in advance, and with respect to objects of these data, the number of the objects is examined, and the total time is obtained from the standard times of the number of objects. Regarding an object having no standard time, image data is actually generated for obtaining image generation time. Then, the respective times are added up, and it is determined based on the total time whether or not there is a possibility of over-run.

Figure 15:
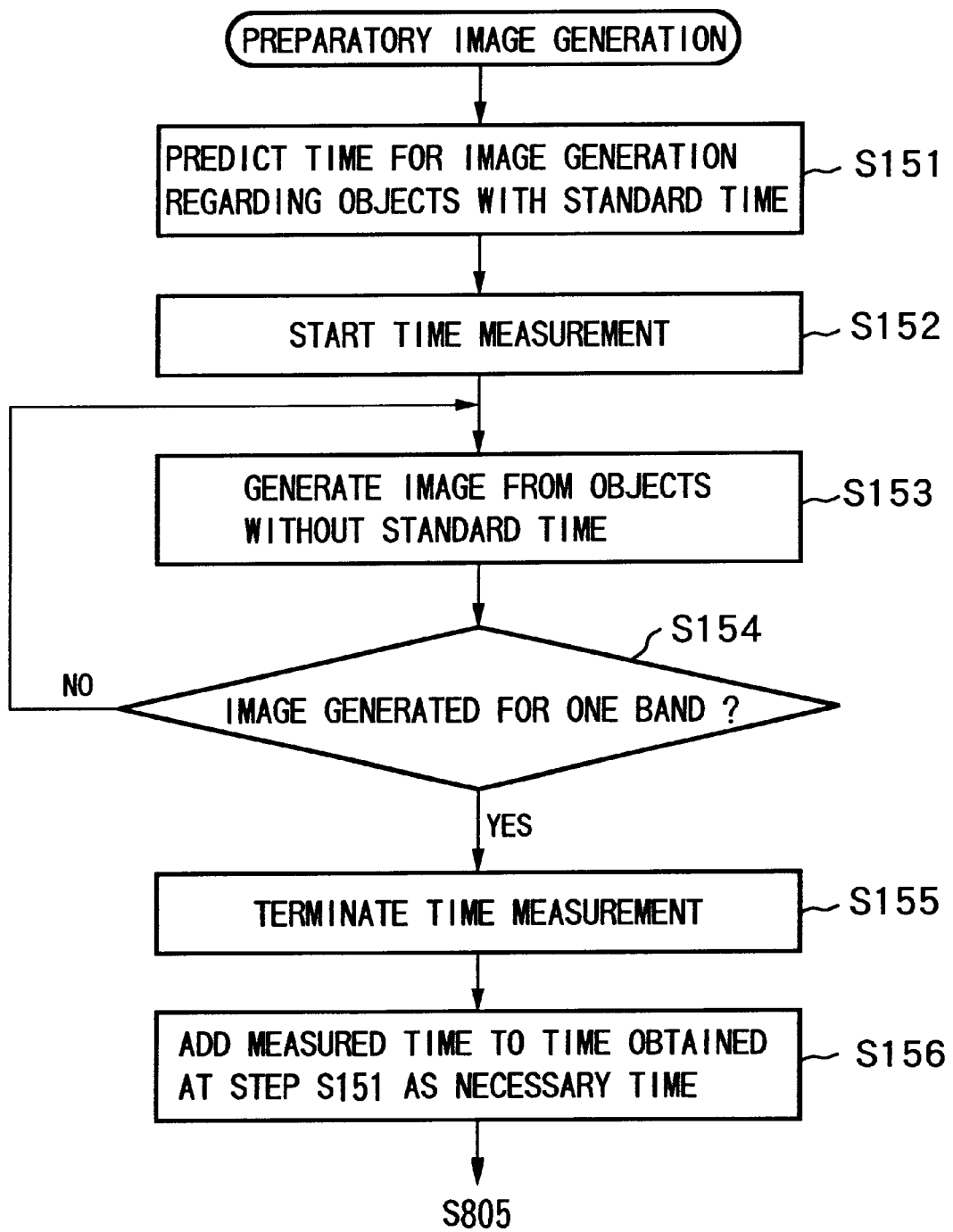
FIG. 15 is a flowchart showing the procedure of preparatory image generation according to a fifth embodiment.

FIG. 15 shows a procedure of preparatory image generation according to the fifth embodiment. At step S151, in the processing list, regarding objects having standard time, the standard times are added up, and time necessary for image generation is predicted. At step S152, the time measuring unit 1103 is activated to start time measurement. At step S153, preparatory image generation is performed with respect to objects without standard time. This processing is repeated for the entire processing list.

When it is determined at step S154 that the image generation for the entire processing list has been completed, the time measurement is terminated at step S155.

At step S156, the time predicted at step S151 is added to the time measured at steps S152 to S155. The resulting time is used, as image generation time, in processing at steps S805 and S806 in FIG. 8.

As described above, the printer according to the first to third embodiments performs preparatory image generation prior to printing, and measures time necessary for image generation for each band, thus reliably determines possibility of over-run in band printing, and prevents over-run without wasting memory.

Further, image data of a band predicted to cause over-run is compressed and stored, which improves efficiency of memory use. This provides the apparatus with a low price.

Other Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. An image output apparatus that receives print data, said apparatus comprising:

memory for storing a series of object data sorted in a band unit by analyzing the print data;

generating means for generating image data by rasterizing the object data in the band unit;

image-output means for outputting the image data as an image;

a clock for measuring a time taken for generating the image data for a band by said generating means; and a controller for controlling said image-output means to perform print processing with the image data generated preparatorily by said generating means, or controlling said generating means to generate image data by rasterizing the object data again, in accordance with the time measured by said clock.

2. The image output apparatus according to claim 1, wherein the series of object data includes a predetermined measurement start code at a head of the series of object data, and a predetermined measurement end code at an end of the series of object data, and wherein said clock measures time from a point where the measurement start code is processed to a point where the measurement end code is processed.

3. The image output apparatus according to claim 1, further comprising image memory for storing image data generated from the series of object data.

4. The image output apparatus according to claim 1, further comprising time memory for storing a necessary time for generating the image data corresponding to the series of object data.

5. The image output apparatus according to claim 1, wherein the series of object data corresponds to a band divided from an image for one page, and wherein if a necessary time for outputting image data from one band by said image-output means is shorter than a necessary time for generating the image data for the band, said controller determines that the image data of the band cannot be generated in a predetermined time required for outputting the image data for the band and stores image data preparatorily generated by said generating means, and, after preparatory image generation from object data for one page has been completed, for a band of which said controller determines that image data can be generated in the predetermined time, said image generating means generates image data from the object data in parallel to image output of a previous band and said image-output means outputs the generated image data following image output of the previous band, while for the band of which said controller has determined that image data cannot be generated in the predetermined time, said image-output means outputs the image data preparatorily generated and stored following image output of a previous band.

6. The image output apparatus according to claim 1, wherein if it is determined that image generation can be performed in a predetermined time required for outputting image data for the band unit by the image-output means, the preparatorily-generated image data is deleted.

7. The image output apparatus according to claim 1, wherein if it is determined that image generation cannot be performed in the predetermined time required for outputting data for the band unit by the image-output means, the preparatorily-generated image data is compressed and stored.

8. The image output apparatus according to claim 7, wherein in outputting image data, the compressed and stored preparatorily-generated image data is expanded and outputted.

9. The image output apparatus according to claim 5, wherein the series of object data is classified in band units.

10. The image output apparatus according to claim 5, wherein prior to preparatory image generation by said generating means, said controller calculates a predicted necessary time for generating image data of a band from a number of object data included in each band, and said generating means performs the preparatory image generation with respect to a band having the predicted necessary time longer than a predetermined value.

11. The image output apparatus according to claim 5,
wherein a standard time for generating image data is stored in advance in accordance with a type of object data, and
wherein, in a band with object data having the stored standard time, said controller integrates the standard time, while with object data having no stored standard time, said generating means performs the preparatory image generation and said clock measures a necessary time for the preparatory image generation, and adds the measured necessary time to the integrated standard time, as a necessary time for generating image data from the band.

12. A control method for an image output apparatus which generates image data by rasterizing a series of object data, sorted in a band unit by analyzing print data, and outputs the image data as an image from image output means, said method comprising:
a generating step of preparatorily generating image data by rasterizing the object data in the band unit;
a measuring step of measuring a necessary time for image generation for a band in said generating step; and
a control step of controlling the image output means to perform print processing with the image data generated preparatorily in said generating step, or controlling the image output means to generate image data by rasterizing the object data again, in accordance with the necessary time measured in said measuring step.

13. The control method according to claim 12, wherein if it is determined that image generation can be performed in a predetermined time required for outputting image data for the band unit by the image output means, the preparatorily-generated image data is deleted.

14. The control method according to claim 12, wherein if it is determined that image generation cannot be performed in a predetermined time required for outputting image data for the band nit by the image output means, the preparatorily-generated image data is compressed and stored.

15. The control method according to claim 14, wherein in outputting image data, the compressed and stored preparatorily-generated image data is expanded and outputted.

16. The control method according to claim 12,
wherein the series of object data includes a predetermined measurement start code at a head of the series of object data, and a predetermined measurement end code at an end of the series of object data, and
wherein in said measuring step, time from a point where the measurement start code is processed to a point where the measurement end code is processed is measured.

17. The control method according to claim 12, further comprising an image storage step of storing image data generated from the series of object data.

18. The control method according to claim 12, further comprising a time storage step of storing the necessary time for generating the image data corresponding to the series of object data.

19. The control method according to claim 12, further comprising an output control step of controlling image output from the image output means,
wherein the series of object data corresponds to a band divided from an image for one page, and
wherein if a necessary time for outputting image data from one band by the image output means is shorter than a necessary time for generating the image data for the band, it is determined that image data of the band cannot be generated in a predetermined time required for outputting the image data for the band and image data preparatorily generated in said generating step is stored, and, after preparatory image generation from object data for one page has been completed, for a band of which it has been determined that image data can be generated in the predetermined time, image data is generated from object data in parallel to image output of a previous band, and the generated image data is output following image output of the previous band, while for the band of which it has been determined that image data cannot be generated in the predetermined time, the image data preparatorily generated and stored is output following image output of a previous band.

20. The control method according to claim 19, further comprising a step of classifying the series of object data in band units.

21. The control method according to claim 19,
wherein in said measuring step, prior to the preparatory image generation, a predicted necessary time for generating image data of a band is calculated from a number of object data included in each band, and
wherein in said generating step, the preparatory image generation is performed with respect to a band having the predicted necessary time longer than a predetermined value.

22. The control method according to claim 19,
wherein a standard time for generating image data is stored in advance in accordance with a type of object data, and
wherein, in a band with object data having the stored standard time, the standard time is integrated in said measuring step, while with object data having no stored standard time, the preparatory image generation is performed in said generating step, and a time for the preparatory image generation is measured, with the measured time being added to the integrated standard time, as a necessary time for generating image data from the band.

23. A storage medium storing a program with control program codes for an image output apparatus which generates image data by rasterizing a series of object data, sorted in a band unit by analyzing print data, and outputs the image data as an image from image output means, the program comprising:

generation process codes for preparatorily generating image data by rasterizing the object data in the band unit;

measuring process codes for measuring a necessary time for generating image data for a band in said generation process; and control process codes for controlling the image output means to perform print processing with the image data generated preparatorily in said generation process, or controlling the image output means to generate image data by rasterizing the object data again, in accordance with the necessary time measured in said measuring process.

24. The storage medium according to claim 23, wherein if it is determined that image generation can be performed in a predetermined time required for outputting image data for the band unit by the image output means, the preparatorily-generated image data is deleted.

25. The storage medium according to claim 23, wherein if it is determined that image generation cannot be performed in a predetermined time required for outputting image data for the band unit by the image output means, the preparatorily-generated image data is compressed and stored.

26. The storage medium according to claim 23, wherein in outputting image data, the compressed and stored preparatorily-generated image data is expanded and outputted.

27. A printer comprising:

memory that stores a program list including a series of object data sorted in a band unit by analyzing print data;

an image generator that generates image data by rasterizing the object data in the band unit and stores the image data in a band memory;

a printing engine that prints an image, represented by the image data inputted from the band memory, on a medium;

a time measuring unit that obtains a necessary time for generating the image data for a band by the image generator, as a cumulative value of a clock signal; and a controller that controls said printing engine to perform printing of the image data stored in the band memory, or controls said image generator to generate image data by rasterizing the object data again, in accordance with the necessary time.

28. The printer according to claim 27, wherein if it is determined that image generation in real-time can be performed in parallel to image printing by said printing engine, preparatorily-generated image data is deleted.

29. The printer according to claim 27, wherein if it is predicted that image generation in real-time cannot be performed in parallel to image printing by said printing engine, preparatorily-generated image data is compressed and stored.

30. The printer according to claim 29, wherein in outputting image data, the compressed and stored preparatorily-generated image data is expanded and printed.

* * * * *

UNITED STATES PATENT AND TRADEMARK OFFICE
CERTIFICATE OF CORRECTION

PATENT NO. : 6,128,095
DATED : October 3, 2000
INVENTOR(S) : Masahiko Murata

It is certified that error appears in the above-identified patent and that said Letters Patent is hereby corrected as shown below:

Column 8:
Line 64, "performs" should be deleted.

Column 13:
Line 61, "nit" should read --unit--.

Column 15:
Line 29, "claim 23," should read --claim 25,--.

Signed and Sealed this

Nineteenth Day of June, 2001

*Attest:*

NICHOLAS P. GODICI
*Attesting Officer*     *Acting Director of the United States Patent and Trademark Office*